(12) United States Patent
Yoshida

(10) Patent No.: US 10,190,254 B2
(45) Date of Patent: Jan. 29, 2019

(54) SKIN MATERIAL

(71) Applicant: SEIREN CO., LTD., Fukui-shi, Fukui (JP)

(72) Inventor: Norihiko Yoshida, Fukui (JP)

(73) Assignee: Seiren Co., Ltd., Fukui (JP)

( * ) Notice: Subject to any disclaimer, the term of this patent is extended or adjusted under 35 U.S.C. 154(b) by 210 days.

(21) Appl. No.: 15/100,586

(22) PCT Filed: Nov. 13, 2014

(86) PCT No.: PCT/JP2014/005712
§ 371 (c)(1),
(2) Date: May 31, 2016

(87) PCT Pub. No.: WO2015/079637
PCT Pub. Date: Jun. 4, 2015

(65) Prior Publication Data
US 2016/0298291 A1    Oct. 13, 2016

(30) Foreign Application Priority Data
Nov. 29, 2013    (JP) .................................. 2013-247671

(51) Int. Cl.
*B32B 3/26* (2006.01)
*B32B 3/30* (2006.01)
(Continued)

(52) U.S. Cl.
CPC .............. *D06N 3/14* (2013.01); *B32B 3/266* (2013.01); *B32B 3/30* (2013.01); *B32B 5/24* (2013.01); *D06N 3/0068* (2013.01); *D06N 3/0095* (2013.01); *B32B 2307/304* (2013.01); *B32B 2307/402* (2013.01); *B32B 2605/003* (2013.01); *D06N 2205/08* (2013.01); *D06N 2209/065* (2013.01); *D06N 2209/0823* (2013.01); *D06N 2211/10* (2013.01)

(58) Field of Classification Search
CPC ...... D06N 3/14; D06N 3/0068; D06N 3/0095; B32B 3/30; B32B 3/266; B32B 5/24
See application file for complete search history.

(56) References Cited

U.S. PATENT DOCUMENTS

| 2010/0247895 A1* | 9/2010 | Uemura | B32B 7/12 |
| | | | 428/317.7 |
| 2013/0183491 A1* | 7/2013 | Fujisawa | B05D 5/04 |
| | | | 428/141 |

FOREIGN PATENT DOCUMENTS

| JP | 55-137278 A | 10/1980 |
| JP | 63-139739 A | 6/1988 |

(Continued)

OTHER PUBLICATIONS

Chinese Official Action dated Oct. 20, 2017 and English translation.

*Primary Examiner* — Hai Vo
(74) *Attorney, Agent, or Firm* — Norris McLaughlin, P.C.

(57) ABSTRACT

A skin material (1) includes a cellular heat-insulating layer (3) and a coloring layer (4) which are sequentially stacked on a fibrous substrate (2) and has protrusions and recesses on a front face (6). The cellular heat-insulating layer (3) has a softening temperature of 110 to 250° C. A contact cool feeling (Qmax) of the front face (6) of the skin material (1) is 0.30 W/cm$^2$ or less both before and after a heat treatment for 2400 hours at 70° C.

7 Claims, 1 Drawing Sheet

(51) Int. Cl.
*B32B 5/24* (2006.01)
*D06N 3/00* (2006.01)
*D06N 3/14* (2006.01)

(56) References Cited

FOREIGN PATENT DOCUMENTS

| | | |
|---|---|---|
| JP | 1-216828 A | 8/1989 |
| JP | 2-061181 A | 3/1990 |
| JP | 5-025780 A | 2/1993 |
| JP | 5-195444 A | 8/1993 |
| JP | 2001-253003 A | 9/2001 |
| JP | 2002-000399 A | 1/2002 |
| JP | 2007-277485 A | 10/2007 |
| JP | 2014-012914 A | 1/2014 |

* cited by examiner

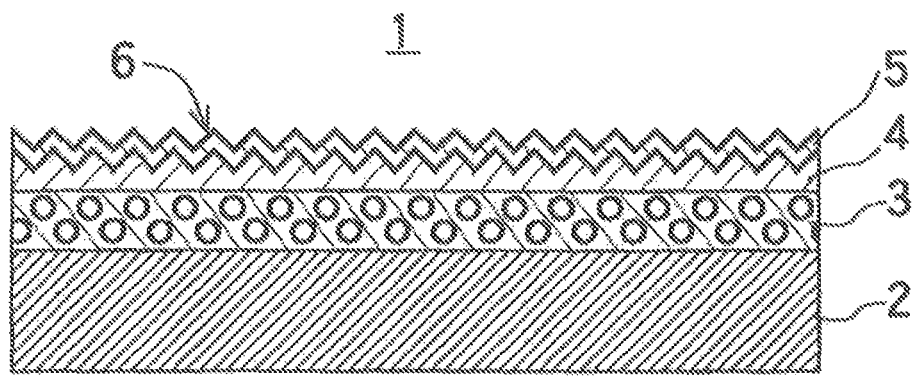

SKIN MATERIAL

TECHNICAL FIELD

The present invention relates to a skin material, and particularly to a skin material having a low contact cool/hot feeling.

BACKGROUND ART

As skin materials, there have conventionally been, for example, polyvinyl chloride leather, synthetic leather, artificial leather, natural leather, and the like, which are obtained by forming a resin layer on a fibrous substrate. These are generally susceptible to an outside air temperature as compared to a skin material made of only a fibrous material. Accordingly, when exposed to an extreme temperature, a skin material itself becomes excessively hot or cold. Thus, when the skin material comes in contact with a skin, the skin is subjected to a rapid temperature change, and feels discomfort. Particularly, it becomes a significant problem when the skin material is used for a space that is affected by the outside air temperature, such as a vehicle interior material.

In order to solve the problem, Patent Document 1 discloses a method of preparing a cover cushion material (synthetic leather) with a temperature adjusting material that is obtained by dispersing microcapsules, which encapsulate a latent heat storage agent that generates a phase change of liquid-solid, in a base material, to thereby suppress the cover cushion material from becoming excessively hot or cool. However, in the aspect described above, although some effects are obtained, the use of the latent heat storage agent for the entire skin material incurs expenses and is poor in versatility.

PRIOR ART DOCUMENTS

Patent Documents

Patent Document 1: Japanese Patent Laid-Open No. 2002-399

SUMMARY OF THE INVENTION

Problem that the Invention is to Solve

In order to solve the problem described above, the present inventor has proposed a synthetic leather having an improved contact cool/hot feeling, which is obtained by forming a cellular heat-insulating layer in a part of a resin layer, in Japanese Patent Application No. 2013-99297 which is not yet published on a priority date of the present application. In a vehicle interior space, a skin material is exposed to an extreme temperature as described above. It was found that particularly at the time of exposure to a high temperature, closed holes of the cellular heat-insulating layer are deformed, thereby significantly lowering an intrinsic effect (a contact cool/hot feeling) of the heat-insulating layer.

The present invention has been made in view of the above-described problems, and an object thereof is to provide a skin material capable of maintaining, even when exposed to a high temperature for a long time, a contact cool/hot feeling that allows the skin material to be hardly affected by an exposure to an extreme temperature, and to hardly give a feeling of temperature change to a skin in contact with the skin material.

Means for Solving the Problem

A skin material according to the present embodiment is a skin material including a cellular heat-insulating layer and a coloring layer which are sequentially stacked on a fibrous substrate, and has unevennesses on the front face, and is characterized in that the cellular heat-insulating layer has a softening temperature of 110° C. to 250° C., and a contact cool feeling (Qmax) of the front face of the skin material is 0.30 W/cm$^2$ or less both before and after a heat treatment for 2400 hours at 70° C.

Advantage of the Invention

According to the present embodiment, it is possible to provide a skin material capable of maintaining, even when exposed to a high temperature for a long time, a contact cool/hot feeling that allows the skin material to be hardly affected by an exposure to an extreme temperature, and to hardly give a feeling of temperature change to a skin in contact with the skin material.

BRIEF DESCRIPTION OF THE DRAWINGS

FIG. 1 is a schematic sectional view of a skin material according to an embodiment.

MODE FOR CARRYING OUT THE INVENTION

Hereinafter, an embodiment of the present invention will be described in detail.

A skin material according to the present embodiment is a skin material including, as resin layers, a cellular heat-insulating layer and a coloring layer which are sequentially stacked on a fibrous substrate, and has unevennesses on the front face of the skin material. Here, the front face of the skin material is a design surface appearing on a front side when the skin material is used as a skin that covers the surface of an object in various applications such as a vehicle interior material, and is a surface with which, for example, a person may come in contact. On the front face of the skin material, unevennesses are formed by, for example, forming concave portions, forming convex portions, or forming combinations of concave and convex portions. As the forming method, a method of applying a resin to a releasable substrate having an uneven pattern, or a method using an embossing processing may be exemplified.

FIG. 1 schematically illustrates a sectional structure of a skin material 1 according to an embodiment. In the skin material 1, a cellular heat-insulating layer 3 and a coloring layer 4 are sequentially stacked on one surface of a fibrous substrate 2. Also, in the illustrated example, a protective layer 5 is stacked on the coloring layer 4. Also, unevennesses (that is, uneven patterns) are formed on a front face 6 of the skin material 1.

As a fibrous substrate used in the present embodiment, a fabric such as a woven fabric, a knitted fabric, or a non-woven fabric, or a natural leather may be exemplified. As the fabric, a fabric obtained by being coated or impregnated with known solvent-based or water-based polymer compounds such as a polyurethane resin or a copolymer thereof, followed by dry coagulation or wet coagulation may be employed. The kind of fiber is not particularly limited, but known fibers such as natural fibers, regenerated fibers, semi-synthetic fibers, or synthetic fibers, may be used, and two or more kinds of these fibers may be used in combination. Among them, from the viewpoint of a strength and a workability, synthetic fibers, especially polyester fibers are preferred. Also, the fibrous substrate may be one colored by dyes or pigments.

The thickness of the fibrous substrate is not particularly limited, but preferably ranges from, for example, 0.2 mm to 10 mm, and more preferably from 0.5 mm to 2.0 mm. When the thickness is 0.2 mm or more, the skin material is hardly affected by an outside air temperature, and closed holes of the cellular heat-insulating layer are suppressed from being deformed, thereby increasing the effect of maintaining the contact cool/hot feeling. This may also suppress the formation of a paper-like texture with no volume, and an impairment in merchantability. When the thickness of the fibrous substrate is 10 mm or less, a heat storage property is lowered, thereby suppressing a hot feeling at the time of a touch under a high temperature environment, or an impairment of a texture.

The specific gravity of the fibrous substrate is not particularly limited, but preferably ranges from, for example, 0.005 g/cm$^3$ to 0.1 g/cm$^3$, and more preferably 0.01 g/cm$^3$ to 0.05 g/cm$^3$. When the specific gravity is 0.005 g/cm$^3$ or more, the skin material is hardly affected by an outside air temperature, and closed holes of the cellular heat-insulating layer are suppressed from being deformed, thereby increasing the effect of maintaining the contact cool/hot feeling. Also, it is possible to prevent a breaking strength, a tear strength, and a texture from being impaired. Also, when the specific gravity is 0.1 g/cm$^3$ or less, it is possible to prevent the texture from being impaired.

The cellular heat-insulating layer in the present embodiment is a heat-insulating layer having a large number of closed holes (that is, non-through closed holes). Since the layer has many holes, the layer hardly conduct heat, and the skin material is hardly affected by the outside air temperature, thereby obtaining a skin material having a low contact cool/hot feeling.

The cellular heat-insulating layer has a softening temperature ranging from 110° C. to 250° C., and more preferably from 130° C. to 220° C. When the softening temperature of the cellular heat-insulating layer is 110° C. or more, deformation of closed holes may be suppressed even at the time of exposure to a high temperature, therefore it is possible to increase the effect of maintaining the contact cool/hot feeling, and to suppress deformation of an external appearance. When the softening temperature is 250° C. or less, it is possible to provide a good texture or a good bending resistance of the obtained synthetic leather.

The softening temperature of the cellular heat-insulating layer is measured by a method in accordance with JIS K7196. In the following examples, as a testing machine, a thermal mechanical analysis device (model EXSTAR TMA-SS6100, manufactured by Hitachi High-Tech Science Co., Ltd.) was used, and as an indenter, one having a form of a penetration probe with a needle tip diameter of 1.0 mm was used.

The shape of the closed holes in the cellular heat-insulating layer is not particularly limited, and may be an amorphous shape. In view of a durability, the shape is preferably spherical. In addition, the size of the closed holes is not particularly limited, and, for example, the major diameter of the closed holes ranges preferably from 10 µm to 200 µm, and more preferably from 15 µm to 100 µm. When the major diameter is 10 µm or more, the effect of the contact cool/hot feeling may be increased. In addition, when the major diameter is 200 µm or less, it is possible to prevent an external appearance, a texture, or an abrasion resistance from being impaired.

The area ratio of the closed holes of the cellular heat-insulating layer, i.e., the ratio occupied by the closed holes in the vertical cross section of the cellular heat-insulating layer is not particularly limited, and the ratio ranges preferably from, for example, 75% to 95%, and more preferably from 80% to 90%. When the area ratio of the closed holes is 75% or more, the effect of the contact cool/hot feeling may be increased. When the area ratio of the closed holes is 95% or less, it is possible to prevent a durability, particularly, an abrasion resistance, a bending resistance, a tensile strength or a tear strength from being impaired.

A calculation method of the area ratio of the closed holes obtains an area ratio of the closed hole portion to an area occupied by the entire cellular heat-insulating layer in the vertical section through, for example, an observation of the vertical section of the layer using, for example, an electron microscope or a microscope, and an image processing.

A means of forming a large number of closed holes in the cellular heat-insulating layer is not particularly limited, but may adopt a known method. For example, physical foaming by stirring of a machine, chemical foaming by addition of a foaming agent, or formation of closed holes by addition of hollow fine particles may be exemplified. Alternatively, after holes are formed through wet coating of a polyurethane resin, the layer surface may be covered with a non-porous layer so as to form closed holes. Preferably in view of easy adjustment of a shape or size, and an area ratio of the closed holes, the formation of the closed holes by addition of hollow fine particles is preferred. That is, in one embodiment, it is preferred that the cellular heat-insulating layer is formed by mixing hollow fine particles with a resin serving as a matrix (i.e., a base material or a main agent), the cellular heat-insulating layer contains a large number of hollow fine particles therein, and a large number of closed holes are formed by the hollow fine particles.

The hollow fine particles refer to spherical particles having fine internal voids covered with films made of various materials (called, for example, outer shells, or outer walls). Particularly, it is preferred that they do not undergo a cubical expansion even at a heat treatment. By using such hollow fine particles, it is possible to minimize a volume fluctuation of the cellular heat-insulating layer during manufacturing, and reduce a variation in quality. Further, it is possible to prevent the resin around the hollow fine particles from stretching and thinning, and to improve an abrasion resistance.

As the hollow fine particles, various particles satisfying the above-described conditions may be used. For example, organic hollow fine particles having outer shells made of a thermosetting resin such as a phenol resin, an epoxy resin or a urea resin, or a thermoplastic resin such as an acrylic resin or a vinyl chloride resin may be exemplified. Alternatively, inorganic hollow fine particles having outer shells made of, for example, glass, shirasu, silica, alumina or carbon may be exemplified. Further, organic hollow fine particles having surfaces covered with inorganic fine powder such as calcium carbonate, talc or titanium oxide may be used. Among them, in view of a heat resistance, an abrasion resistance, and a strength, organic hollow fine particles having outer shells made of a thermoplastic resin, or organic hollow fine particles having surfaces covered with inorganic fine powder are preferred.

A glass transition point (Tg) of the thermoplastic resin that forms the outer shells preferably ranges from 50° C. to 150° C. from the viewpoint of a heat resistance, and more preferably from 60° C. to 90° C. When the glass transition point of the thermoplastic resin that forms the outer shells is 50° C. or more, it is possible to prevent leakage of inclusions, and deformation of the outer shells of the hollow fine particles, thereby maintaining an effect of improving a contact cool/hot feeling. When the glass transition point is 150° C. or less, it is possible to prevent embrittlement of outer shells, and deformation of the outer shells of the hollow fine particles, thereby maintaining an effect of improving a contact cool/hot feeling. Also, the texture is suppressed from becoming coarse and hard.

A softening temperature of the thermoplastic resin that forms the outer shells preferably ranges from 110° C. to 250° C. and more preferably from 130° C. to 220° C. When this range is satisfied, even at the time of exposure to a high temperature, the outer shells of the hollow fine particles are not deformed, and further, closed holes of the cellular heat-insulating layer are hardly deformed, thereby enhancing the effect of maintaining a contact cool/hot feeling.

Here, the glass transition point and the softening temperature of the thermoplastic resin that forms the outer shells are measured as follows. The glass transition point is measured by a method in accordance with JIS K7121, and in the following examples, as a testing machine, a high-sensitivity differential scanning calorimeter (model EXSTAR-DSC6200, manufactured by Hitachi High-Tech Science Co., Ltd.) was used. For the softening temperature, as a testing machine, a thermal mechanical analysis device (model TMA2940, manufactured by TA instruments Co., Ltd.) was used. When 250 μg of hollow fine particles (in the case of thermal expansion, particles in the foamed state are used) were put in an aluminum cup with a diameter of 7 mm, and a depth of 1 mm, and heated at a heating rate of 5° C./min from 80° C. to 300° C. in a state where a force of 0.1 N was applied from above, a vertical displacement of the applied indenter was continuously measured. Then, a temperature at which a maximum displacement was shown was set as the softening temperature of the outer shells of the hollow fine particles.

The hollow fine particles having outer shells made of a thermoplastic resin used as the preferred embodiment are typically those obtained by previously foaming a microcapsule type foaming agent. The microcapsule type foaming agent itself includes a volatile type foaming agent such as a low boiling point hydrocarbon, in an outer shell made of a thermoplastic resin that can be softened and expanded by a heat treatment. In the present embodiment, the microcapsule type foaming agent may be foamed and used, or may be used as a foamed body obtained through previous foaming. From the viewpoint of a heat resistance, a foamed body is preferred.

As the inclusion of the microcapsule type foaming agent, in consideration of the shape retention of microcapsules under a low temperature environment, a lower hydrocarbon having a boiling point of 0° C. to 100° C. is preferred, and specifically, for example, butane, isobutane, pentane, isopentane, or neopentane may be exemplified.

In the present embodiment, such hollow fine particles may be used alone or in combination of two or more kinds thereof.

As a resin used as the main agent in the cellular heat-insulating layer, that is, a resin serving as a matrix, for example, known synthetic resins such as a polyurethane resin, a polyamino acid resin, a vinyl chloride resin, a SBR resin, a NBR resin, an acrylic resin, a polyester resin, and the copolymers thereof may be exemplified. These may be used alone or in combination of two or more kinds thereof. Among them, in view of an abrasion resistance, a texture or the like, it is preferable to select a polyurethane resin or a copolymer thereof or a mixed resin including a polyurethane resin as a main component (these are collectively referred to as a polyurethane-based resin), and a polycarbonate polyurethane resin is more preferable. The type of the resin may be a solvent-free type, a solvent-based type, or a water-based type, but is not particularly limited.

A glass transition point (Tg) of the matrix preferably ranges from −100° C. to 50° C., and more preferably from −70° C. to −10° C. When the glass transition point is −100° C. or more, a heat resistance is improved, and deformation of closed holes is suppressed at the time of exposure to a high temperature. Thus, it is possible to increase the effect of maintaining the contact cool/hot feeling, and to suppress deterioration of an external appearance. When the glass transition point is 50° C. or less, a synthetic leather having a flexible texture and an excellent bending resistance may be obtained. Here, the matrix refers to a portion of a cellular heat-insulating layer excluding the hollow fine particles, and composed of the main agent and an additive such as a crosslinking agent or a leveling agent as an optional component.

A softening temperature of the matrix preferably ranges from 110° C. to 250° C. and more preferably from 130° C. to 220° C. When this is satisfied, the softening temperature of the cellular heat-insulating layer may range from 110° C. to 250° C.

Here, the glass transition point and the softening temperature of the matrix are measured as follows. The glass transition temperature is measured by a method in accordance with JIS K7121, and in the following examples, as a testing machine, a high-sensitivity differential scanning calorimeter (model EXSTAR-DSC6200, manufactured by Hitachi High-Tech Science Co., Ltd.) was used. The softening temperature is measured by a method in accordance with JIS K7196. In the following examples, as a testing machine, a thermal mechanical analysis device (model EXSTAR TMA-SS6100, manufactured by Hitachi High-Tech Science Co., Ltd.) was used, and as an indenter, one having a form of a penetration probe with a needle tip diameter of 1.0 mm was used.

In the cellular heat-insulating layer, an additive such as a crosslinking agent, a leveling agent, a pigment, or a matting agent may be used.

The thickness of the cellular heat-insulating layer is not particularly limited, but may range preferably from, for example, 20 μm to 300 μm, more preferably from 50 μm to 200 μm, and further more preferably from 100 μm to 200 μm. When the thickness is 20 μm or more, an effect of improving a contact cool/hot feeling may be increased. When the thickness is 300 μm or less, a deterioration of a texture may be suppressed.

The coloring layer in the present embodiment is a layer for concealing the cellular heat-insulating layer, and coloring the skin material with a desired color.

As a resin that forms the coloring layer, the same resin as the main agent of the cellular heat-insulating layer may be used. Among them, in view of an abrasion resistance, a texture or the like, a polyurethane resin or a copolymer thereof or a mixture including a polyurethane resin as a main component (these are collectively referred to as a polyurethane-based resin) is preferred, and a polycarbonate polyurethane resin is more preferable. The type of the resin may be a solvent-free type, a solvent-based type, or a water-based type, but is not particularly limited.

To the coloring layer, an inorganic pigment and/or an organic pigment is added as a coloring agent. The addition amount of the pigment is not particularly limited, but preferably ranges from, for example, 1.0% to 20% by mass in terms of solid content, and more preferably from 5.0% to 15% by mass. When the addition amount is 1.0% by mass or more, a concealing property of the cellular heat-insulating layer, or a sufficient colorability for a design may be increased. When the addition amount is 20% by mass or less, an abrasion fastness is not impaired.

In the coloring layer, in addition to the pigment, if necessary, known additives such as a lubricating agent, a crosslinking agent, a matting agent, and a leveling agent may be used.

The thickness of the coloring layer is not particularly limited, but may range preferably from, for example, 1 μm to 100 μm, and more preferably from 5 μm to 40 μm. When the thickness is 1 μm or more, an abrasion resistance may be improved, and a concealing property of the cellular heat-insulating layer, or a sufficient colorability for a design may be increased. When the thickness is 100 μm or less, an effect of improving a contact cool/hot feeling may be increased.

The skin material according to the present embodiment may further include a protective layer formed on the coloring layer, from the viewpoint of an abrasion resistance.

As a resin that forms the protective layer, the same resin as the main agent of the cellular heat-insulating layer may be used. Among them, in view of an abrasion resistance, a texture or the like, a polyurethane resin or a copolymer thereof or a mixture including a polyurethane resin as a main component (these are collectively referred to as a polyurethane-based resin) is preferred, and a polycarbonate polyurethane resin is more preferable. The type of the resin may be a solvent-free type, a solvent-based type, or a water-based type, but is not particularly limited.

In the protective layer, if necessary, known additives such as a lubricating agent, a crosslinking agent, a matting agent, and a leveling agent may be used.

The thickness of the protective layer is not particularly limited, but may range preferably from, for example, 1 μm to 50 μm, and more preferably from 5 μm to 20 μm. When the thickness is 1 μm or more, an abrasion resistance may be increased. When the thickness is 50 μm or less, a reduction of the effect of improving the contact cool/hot feeling may be suppressed.

The sum of the thickness of the coloring layer and the protective layer is not particularly limited, but, in view of a contact cool/hot feeling, may range preferably from 2 μm to 150 μm, more preferably from 10 μm to 60 μm, and further more preferably from 20 μm to 50 μm. When the sum of the thickness is 2 μm or more, an abrasion resistance may be increased. When the sum of the thickness is 150 μm or less, a reduction of the effect of improving the contact cool/hot feeling may be suppressed.

The lamination of the cellular heat-insulating layer and the coloring layer is carried out, for example, in the following manner. (A) A resin liquid that forms a cellular heat-insulating layer is applied to one surface of a fibrous substrate, and is dry-solidified, so that the cellular heat-insulating layer is laminated on the fibrous substrate. Then, a resin liquid that forms a coloring layer is applied to the cellular heat-insulating layer, and is dry-solidified, so that the cellular heat-insulating layer and the coloring layer are laminated. Then, an uneven pattern is formed on the front face by embossing. In another method, (B) a resin liquid that forms a coloring layer is applied to a releasable substrate having an uneven pattern, and is dry-solidified, thereby forming the coloring layer. Then, a resin liquid that forms a cellular heat-insulating layer is applied to the coloring layer, which is then crimped on one surface of a fibrous substrate while an adhesiveness is maintained, so that the cellular heat-insulating layer and the coloring layer are laminated. In a further method, (C) a resin liquid that forms a coloring layer is applied to a releasable substrate having an uneven pattern, and is dry-solidified, thereby forming the coloring layer. Then, a resin liquid that forms a cellular heat-insulating layer is applied to the coloring layer, and is dry-solidified, so that the cellular heat-insulating layer and the coloring layer are formed on the releasable substrate. Then, the coloring layer is adhered on one surface of a fibrous substrate by an adhesive, so that, the cellular heat-insulating layer and the coloring layer are laminated through an adhesive layer.

As a method of applying each resin liquid, a known method such as knife coating, roll coating, gravure coating, or spray coating may be adopted.

When the protective layer is formed, the lamination of the protective layer is carried out, for example, in the following manner. After the cellular heat-insulating layer and the coloring layer are laminated on the fibrous substrate by the methods (A) to (C), a resin liquid that forms a protective layer is applied to the coloring layer, and dry-solidified, thereby forming the protective layer. In another method example, in the above-described method (A), after the coloring layer is formed and before the embossing is performed, a resin liquid that forms a protective layer is applied to the coloring layer, and is dry-solidified, thereby forming the protective layer. Then, an uneven pattern is formed on the front face by embossing. In a further method example, in the above-described methods (B) and (C), on the releasable substrate, first, a resin liquid that forms a protective layer is applied, and dry-solidified, thereby forming the protective layer. Then, a resin liquid that forms the coloring layer is applied, thereby forming the coloring layer. As a method of applying a resin liquid of the protective layer, a known method such as knife coating, roll coating, gravure coating, or spray coating may be adopted.

In the skin material according to the present embodiment, the contact cool feeling (Qmax) of the front face of the skin material is 0.30 W/cm$^2$ or less both before and after a heat treatment for 2400 hours at 70° C. That is, the contact cool feeling (Qmax) before a predetermined heat treatment is applied is 0.30 W/cm$^2$ or less, and the contact cool feeling (Qmax) after the predetermined heat treatment is applied is also 0.30 W/cm$^2$ or less. As described above, the skin material of the present embodiment is low in Qmax at the initial stage (before the heat treatment), and thus a contact cool/hot feeling is excellent, such that the skin material is hardly affected by an exposure to an extreme temperature, and hardly gives a feeling of temperature change to a skin in contact with the skin material. Furthermore, since Qmax is also low after the heat treatment, even at the time of exposure to a high temperature for a long time, the excellent contact cool/hot feeling may be maintained. Thus, for example, even when the skin material is used in a space that is susceptible to an outside air temperature, such as a vehicle interior material, a deterioration of the contact cool/hot feeling with elapse of time may be suppressed.

The contact cool feeling (Qmax) of the front face of the skin material, as a value before a heat treatment, is preferably 0.25 W/cm$^2$ or less, and more preferably 0.20 W/cm$^2$ or less. The lower limit is not particularly limited, but is, for example, 0.05 W/cm$^2$ or more. The contact cool feeling (Qmax), as a value after a heat treatment, is more preferably 0.25 W/cm² or less. The lower limit is not particularly limited, but is, for example, 0.10 W/cm² or more.

In the contact cool feeling (Qmax) of the front face of the skin material, a difference of the contact cool feeling between before and after the heat treatment is preferably 0.05 W/cm² or less, and more preferably 0.03 W/cm² or less. When the difference is 0.05 W/cm² or less, a contact cool/hot feeling is not lost even at the time of exposure to an extreme temperature.

According to the present embodiment, as described above, when an unevenness is formed on the front face of the skin material after the cellular heat-insulating layer is formed, the contact cool feeling may be lowered. Due to the formation of the unevenness, when a person touches the skin material, the area ratio of the front face of the skin material with which a human skin comes in close contact may be suppressed, and a transfer of heat between the human skin and the skin material may be reduced. Thus, it is difficult to feel the change in temperature, and a contact cool/hot feeling becomes low (that is, the performance of the contact cool/hot feeling is improved). Also by a heat insulation effect in the cellular heat-insulating layer, it is possible to reduce the contact cool/hot feeling, and by setting, for example, the area ratio of the closed holes or the thickness of the cellular heat-insulating layer, the value of Qmax before a heat treatment may be easily set within the above range.

In Qmax after the heat treatment, it is effective to suppress deformation of closed holes of the cellular heat-insulating layer due to heat. For this purpose, it is effective that the softening temperature of the cellular heat-insulating layer is set within a range of 110° C. to 250° C. as described above. Also, setting the softening temperature of the matrix of the cellular heat-insulating layer within the above-described range of 110° C. to 250° C. and setting the glass transition point of the matrix within the above-described range of −100° C. to 50° C. are also effective in improving the heat resistance of the cellular heat-insulating layer, and suppressing deformation caused by heat. Also, setting the softening temperature of the resin that forms outer shells of hollow fine particles contained in the cellular heat-insulating layer within the above-described range of 110° C. to 250° C. and setting the glass transition point of the resin within the above-described range of 50° C. to 150° C.: are also effective in suppressing deformation of the hollow fine particles under a high temperature environment.

Here, the condition of the heat treatment is a processing using a dryer for 2400 hours at 70° C., and is based on an assumption of a vehicle interior space in summer.

The contact cool feeling (Qmax) is measured using a precision rapid thermal property measurement device (KES-F-M7 Thermo Labo type II, manufactured by Kato Tech Co., Ltd.). This device includes a sample stage on which the skin material is pasted as a sample, and a detector. A copper thin plate is attached to one surface of the detector, and a temperature sensor is attached to the back surface of the copper thin plate. Each of the sample stage and the detector is attached with a heater, and its temperature setting can be independently made by a control device.

The skin material is pasted on the sample stage, the sample stage is set to 20° C. by the control device, and the temperature of the copper thin plate of the detector is set to 30° C. Subsequently, in an atmosphere of 20° C.×60% RH, the front face of the skin material on the sample stage is brought into contact with the copper thin plate of the detector while the sensor output from the temperature sensor is recorded. Here, the copper thin plate is deprived of heat by the sample stage through the skin material, and thus its temperature is decreased. Here, the maximum heat absorption rate (Qmax) is measured. The higher the value of Qmax is, the larger the cool feeling is at the time of a person touch.

A layer of the skin material according to the present embodiment, which becomes an outermost surface (specifically, the protective layer when the protective layer is formed, or the coloring layer when the protective layer is not formed) is preferably not porous, that is, non-porous. This is because a non-porous outermost surface layer is advantageous in terms of an abrasion resistance.

In the skin material according to the present embodiment, a contact area ratio on the front face of the skin material is preferably 65% or less.

The contact area ratio on the front face of the skin material refers to a value that is obtained by simply calculating, through a method to be described below, a ratio of the area of the front face of the skin material with which a human skin is in close contact when a person touches the skin material. Based on an assumption that the human skin is generally in close contact with a deep portion to 50 μm from a vertex of a convex portion when the front face with an unevenness is touched, the contact area ratio on the front face of the skin material is calculated by the following method.

On the front face of the skin material, a rectangular region of 2.5 mm×2.0 mm (H×W) is randomly extracted, and a depth at an XY coordinate at an interval of 10 μm is measured using a laser microscope. The ratio of the number of XY coordinates each indicating a depth to 50 μm from the vertex of the highest convex portion (i.e., the highest point in the region) present in the region, with respect to the total number of XY coordinates is set as a contact area ratio on the front face of the skin material. The extraction of the region is performed randomly at 10 locations, and the average of the contact area ratios calculated at the 10 locations is set as a contact area ratio on the front face of the skin material.

When the calculated contact area ratio on the front face of the skin material is 65% or less, the skin material is hardly affected by an exposure to an extreme temperature, and even when a skin touches the skin material, a sudden thermal movement is insignificant between the skin and the skin material. Thus, in the skin material, it is difficult to feel the change in temperature, and a contact cool/hot feeling may become low. The contact area ratio is more preferably 40% or less. Meanwhile, the contact area ratio is preferably 5% or more in view of a design property. More preferably, the contact area ratio is 10% or more, and more preferably 20% or more. In one embodiment, the contact area ratio may range from 30% to 50%.

A skin material which is a target of the present embodiment includes a fibrous substrate, a cellular heat-insulating layer, and a coloring layer as components, but, if necessary, may include one or two or more layers between respective layers.

An application of the skin material of the present embodiment is not particularly limited, but may be used for interior applications such as skin for sofas and chairs, as well as applications of various interior materials for a vehicle such as automobile interior materials (e.g., automotive seats, ceiling materials, dashboards, door lining materials or steering wheels).

EXAMPLES

Example 1

[Fibrous Substrate]

Polyester tricot knitted fabric of 28 gauge (thickness: 1.0 mm to 1.2 mm, specific gravity: 0.03 g/cm$^3$)

[Formulation 1 (for Coloring Layer)]

Main agent: water-based polycarbonate polyurethane resin (BAYDERM Bottom DLV, solid content of 40% by mass): 90 parts by mass Matting agent: silica-containing water-based polycarbonate urethane resin (HYDRHOLAC UD-2, solid content of 25% by mass): 10 parts by mass Crosslinking agent: isocyanate-based crosslinking agent (AQUADERM XL~50, solid content of 50% by mass): 1 part by mass Pigment: carbon black-based black pigment (EUDERM Black B-N, solid content of 25% by mass): 20 parts by mass Water: 20 parts by mass Leveling agent: silicon-based leveling agent (AQUADERM Fluid H, solid content 100% by mass): 1 part by mass All raw materials, except for water, are manufactured by LANXESS Corporation.

Preparation method: preparation was performed with a viscosity of 5,000 cps (B-type viscometer, rotor: No 4, 12 rpm, 23° C.).

[Formulation 2 (for Cellular Heat-Insulating Layer)]

Main agent: water-based polycarbonate polyurethane resin (LCC Binder UB-1770, solid content of 30% by mass): 100 parts by mass Hollow fine particles: foamed microcapsules (manufactured by Matsumoto Yushi-Seiyaku Co., Ltd., Matsumoto Microsphere FN-100S (used in the foamed state by a heat treatment), average particle diameter of 50 µm, solid content 100% by mass, powdered, outer shell: acrylonitrile-based polymer (softening temperature: 150° C., Tg: 70° C.), inclusions: isopentane, foamed product): 2.5 parts by mass.

Crosslinking agent: isocyanate-based crosslinking agent (AQUADERM XL-50, solid content of 50% by mass): 1 part by mass Leveling agent: silicon-based leveling agent (AQUADERM Fluid H, solid content 100% by mass): 1 part by mass Water: 20 parts by mass Raw materials, except for water and hollow fine particles, are manufactured by LANXESS Corporation.

Preparation method: preparation was performed with a viscosity of 5,000 cps (B-type viscometer, rotor: No 4, 12 rpm, 23° C.). The softening temperature of the film fabricated by the prepared coating composition was 150° C. Further, the softening temperature of the film fabricated through the same formulation as Formulation 2 in which the hollow fine particles were excluded (i.e., the softening temperature of the matrix) was 175° C. and Tg of the matrix was −60° C.

[Formulation 3 (for Protective Layer)]

Main agent: water-based polycarbonate polyurethane resin (BAYDERM Finish 61UD, solid content of 35% by mass): 90 parts by mass Matting agent: silica-containing water-based polycarbonate urethane resin (HYDRHOLAC UD-2, solid content of 25% by mass): 10 parts by mass Crosslinking agent: isocyanate-based crosslinking agent (AQUADERM XL-50, solid content of 50% by mass): 1 part by mass Leveling agent: silicon-based leveling agent (AQUADERM Fluid H, solid content 100% by mass): 1 part by mass Water: 20 parts by mass All raw materials, except for water, are manufactured by LANXESS Corporation.

Preparation method: preparation was performed with a viscosity of 200 cps (B-type viscometer, rotor: No 1, 12 rpm, 23° C.).

The polyurethane resin composition for the coloring layer, which was prepared according to Formulation 1 described above, was applied to a release paper (AR-96M, manufactured Asahi Roll Co., Ltd.) having a grain-like uneven pattern, by a comma coater to an average coating thickness of 100 µm in a sheet form, and treated for 3 minutes at 100° C. in a dryer to form a coloring layer. The thickness of the coloring layer was 30 µm. For the thickness of the layer, a vertical section of a synthetic leather was observed by a microscope (manufactured by Keyence Corporation, digital HF microscope VHI-8000), thicknesses of any 10 locations were measured, and an average of these was calculated.

Then, the polyurethane resin composition for the cellular heat-insulating layer, which was prepared according to Formulation 2 described above, was applied to the surface of the coloring layer formed on the release paper by a comma coater to an average coating thickness of 300 µm in a sheet form, and treated for 3 minutes at 100° C. in a dryer to form the cellular heat-insulating layer. The thickness of the layer was 150 µm. The size (major diameter) of the closed holes in the cellular heat-insulating layer was 50 µm, and the area ratio of the closed holes was 90%. For the size of the closed holes, a vertical section of a synthetic leather was observed by a microscope (manufactured by Keyence Corporation, digital HF microscope VH-8000), and the maximum value was set as a size of the closed holes. For the area ratio of the closed holes, a vertical section of the synthetic leather was observed by a microscope (manufactured by Keyence Corp., digital HF microscope VH-8000), an image of a heat insulating layer portion was read by a personal computer, the closed holes were fully filled in white, colors of the closed holes and non-filled portions were binarized in white and black, and the white dot portions were counted by integration to calculate an area ratio of the closed holes.

On the surface of the cellular heat-insulating layer formed on the release paper, an adhesive, which was prepared by adding dimethyl formamide to a polycarbonate polyurethane resin with a viscosity of 5000 cps (B-type viscometer, rotor: No 4, 12 rpm, 23° C.), was applied using a knife coater to an average coating thickness of 200 m. Then, the layer was pre-dried by a heat treatment for 1 min at 100° C., overlaid with a polyester tricot knitted fabric of the fibrous substrate, and pressurized for 1 min at 39.2 N/cm$^2$, and then the release paper was released.

Then, the polyurethane resin composition for the protective layer, which was prepared according to Formulation 3 described above, was applied to the surface of the coloring layer from which the release paper was released, by a reverse coater to an average thickness of 50 µm in a sheet form, and treated for 3 minutes at 100° C. in a dryer to form the protective layer with a thickness of 10 µm, thereby obtaining the synthetic leather of Example 1.

Examples 2 to 13 and Comparative Examples 1 to 5

The synthetic leather of each of Examples 2 to 13 and Comparative Examples 1 to 5 was fabricated in the same manner as in Example 1, except that a cellular heat-insulating layer and hollow fine particles (all were thermal expansion microcapsules foamed through a heat treatment to a desired particle diameter, and used in the foamed state) of the cellular heat-insulating layer were prepared according to Tables 1 and 2. Among the raw materials in the tables, a main agent, a crosslinking agent and a leveling agent are manufactured by LANXESS Corporation, and hollow fine particles are manufactured by Matsumoto Yushi-Seiyaku Co., Ltd.

The contact area ratio on the front face of the skin material of the fabricated synthetic leather was measured, while on each synthetic leather, a contact cool feeling (Qmax), a sensory evaluation of a contact cool feeling, a sensory evaluation of a contact hot feeling, and a texture evaluation were performed by the following method. Then, the results are noted in Tables 1 and 2.

[Contact Area Ratio]

As a laser microscope, VK-8500 (manufactured by Keyence Corporation) was used, and the contact area ratio of the front face of the skin material was calculated by the method described above.

[Contact Cool Feeling (Qmax)]

The contact cool feeling (Qmax) of the front face of the skin material was measured by the method described above using a precision rapid thermal property measurement device (KES-F-M7 Thermo Labo type II, manufactured by Kato Tech Co., Ltd.). As measurement objects, a non-heat treated skin material, and a heat treated skin material after subjected to a heat treatment at 70° C. for 2400 hours in a dryer were adopted. The measured value of Qmax before the heat treatment was set as Q1, and the measured value of Qmax after the heat treatment was set as Q2. These values were noted in Tables 1 and 2, and a difference between Q2 and Q1 (Q2−Q1) was calculated and noted in Tables 1 and 2.

[Sensory Evaluation of Contact Cool Feeling]

A non-heat treated skin material and a heat treated skin material, as test pieces, were left for 30 min at 0° C. Then, a contact cool feeling that a subject feels when the subject brings a palm of his hand into contact with the front face of the skin material was determined according to the following criteria. Sensory evaluation by the subject was calculated by an average of evaluations by 10 subjects.

6 . . . Felt no sudden change in temperature at all
5 . . . Felt very slightly a sudden change in temperature, but felt no discomfort
4 . . . Felt slightly a sudden change in temperature, but felt no discomfort
3 . . . Felt a sudden change in temperature, and felt slightly discomfort
2 . . . Felt considerably a sudden change in temperature, and felt discomfort
1 . . . Felt strongly a sudden change in temperature, and felt considerably discomfort

[Sensory Evaluation of Contact Hot Feeling]

A non-heat treated skin material and a heat treated skin material, as test pieces, were left for 30 min at 70° C. Then, a contact hot feeling that a subject feels when the subject brings a palm of his hand into contact with the front face of the skin material was determined according to the following criteria.

6 . . . Felt no sudden change in temperature at all
5 . . . Felt very slightly a sudden change in temperature, but felt no discomfort
4 . . . Felt slightly a sudden change in temperature, but felt no discomfort
3 . . . Felt a sudden change in temperature, and felt slightly discomfort
2 . . . Felt considerably a sudden change in temperature, and felt discomfort
1 . . . Felt strongly a sudden change in temperature, and felt considerably discomfort

[Texture (Sensory Evaluation)]

A sensory evaluation by a subject was performed, and determined according to the following criteria.

A . . . Quite good (fairly flexible)
B . . . Good (flexible)
C . . . Somewhat bad (somewhat inflexible)
D . . . Bad (hard and inflexible)

TABLE 1

| | | | Exp. 1 | Exp. 2 | Exp. 3 | Exp. 4 | Exp. 5 |
|---|---|---|---|---|---|---|---|
| Cellular heat-insulating layer Formulation (parts by mass) | Main agent: water-based polyurethane resin | LCC Binder UB-1770 | 100 | 60 | 15 | 60 | 15 |
| | | BAYDERM Bottom 51UD | — | 40 | — | 40 | — |
| | | BAYDERM Finish 61UD | — | — | 85 | — | 85 |
| | Hollow fine particles: foamed microcapsules | Matsumoto Microsphere FN-100S | 2.5 | — | — | — | — |
| | | Matsumoto Microsphere F-50 | — | — | — | — | — |
| | | Matsumoto Microsphere F-230D | — | — | — | — | — |
| | | Matsumoto Microsphere F-48 | — | 2.5 | — | 2.5 | — |
| | | Matsumoto Microsphere F-2800D | — | — | 2.5 | — | 2.5 |
| | | Matsumoto Microsphere F-30 | — | — | — | — | — |
| | | Matsumoto Microsphere F-2860D | — | — | — | — | — |
| | Crosslinking agent: isocyanate-based | AQUADERM XL-50 | 1 | 1 | 18 | 1 | 5 |
| | Leveling agent: water dispersion type silicon-based | AQUADERM Fluid H | 1 | 1 | 1 | 1 | 1 |
| | Water | | 20 | 20 | 20 | 20 | 20 |
| Cellular heat-insulating layer Constitution | Cellular heat-insulating layer | Thickness (µm) | 150 | 150 | 150 | 150 | 150 |
| | | Ratio of closed holes (%) | 90 | 90 | 90 | 90 | 90 |
| | | Size of closed holes (major diameter: µm) | 50 | 30 | 20 | 50 | 20 |
| | | Tg of matrix (° C.) | −60 | −70 | 0 | −70 | 0 |
| | | Softening temperature of matrix (° C.) | 175 | 115 | 245 | 115 | 245 |
| | | Softening temperature of cellular heat-insulating layer (° C.) | 150 | 115 | 240 | 115 | 240 |
| | Hollow fine particles | Outer shell resin | Acrylonitrile-based polymer | | | | |
| | | Tg of outer shell (° C.) | 70 | 70 | 70 | 70 | 70 |
| | | Softening temperature of outer shell (° C.) | 150 | 120 | 240 | 120 | 240 |
| | | Inclusions | Isopentane | | | | |
| | | Average particle diameter (µm) | 50 | 30 | 20 | 50 | 20 |

TABLE 1-continued

| Evaluation | Ratio of contact area (%) | | 50 | 50 | 50 | 50 | 50 |
|---|---|---|---|---|---|---|---|
| | Contact cool feeling: Qmax (W/cm$^2$) | Before heat treatment Q1 | 0.20 | 0.20 | 0.20 | 0.20 | 0.20 |
| | | After heat treatment Q2 | 0.20 | 0.25 | 0.20 | 0.21 | 0.20 |
| | | Difference Q2 − Q1 | 0.00 | 0.05 | 0.00 | 0.01 | 0.00 |
| | Contact cool feeling: sensory evaluation | Before heat treatment | 6 | 6 | 6 | 6 | 6 |
| | | After heat treatment | 6 | 4 | 6 | 5 | 6 |
| | Contact hot feeling: sensory evaluation | Before heat treatment | 6 | 6 | 6 | 6 | 6 |
| | | After heat treatment | 6 | 4 | 6 | 5 | 6 |
| | Texture | | B | A | C | B | B |

| | | | Exp. 6 | Exp. 7 | Exp. 8 | Exp. 9 |
|---|---|---|---|---|---|---|
| Cellular heat-insulating layer Formulation (parts by mass) | Main agent: water-based polyurethane resin | LCC Binder UB-1770 | 75 | 75 | 65 | 50 |
| | | BAYDERM Bottom 51UD | 25 | — | 35 | — |
| | | BAYDERM Finish 61UD | — | 25 | — | 50 |
| | Hollow fine particles: foamed microcapsules | Matsumoto Microsphere FN-100S | 2.5 | 2.5 | 2.5 | 2.5 |
| | | Matsumoto Microsphere F-50 | — | — | — | — |
| | | Matsumoto Microsphere F-230D | — | — | — | — |
| | | Matsumoto Microsphere F-48 | — | — | — | — |
| | | Matsumoto Microsphere F-2800D | — | — | — | — |
| | | Matsumoto Microsphere F-30 | — | — | — | — |
| | | Matsumoto Microsphere F-2860D | — | — | — | — |
| | Crosslinking agent: isocyanate-based | AQUADERM XL-50 | 1 | 5 | 1 | 10 |
| | Leveling agent: water dispersion type silicon-based | AQUADERM Fluid H | 1 | 1 | 1 | 1 |
| | Water | | 20 | 20 | 20 | 20 |
| Cellular heat-insulating layer Constitution | Cellular heat-insulating layer | Thickness (μm) | 150 | 150 | 150 | 150 |
| | | Ratio of closed holes (%) | 90 | 90 | 90 | 90 |
| | | Size of closed holes (major diameter: μm) | 50 | 50 | 50 | 50 |
| | | Tg of matrix (° C.) | −70 | −20 | −70 | −10 |
| | | Softening temperature of matrix (° C.) | 135 | 215 | 120 | 240 |
| | | Softening temperature of cellular heat-insulating layer (° C.) | 135 | 150 | 120 | 150 |
| | Hollow fine particles | Outer shell resin | Acrylonitrile-based polymer | | | |
| | | Tg of outer shell (° C.) | 70 | 70 | 70 | 70 |
| | | Softening temperature of outer shell (° C.) | 150 | 150 | 150 | 150 |
| | | Inclusions | Isopentane | | | |
| | | Average particle diameter (μm) | 50 | 50 | 50 | 50 |
| Evaluation | Ratio of contact area (%) | | 50 | 50 | 50 | 50 |
| | Contact cool feeling: Qmax (W/cm$^2$) | Before heat treatment Q1 | 0.20 | 0.20 | 0.20 | 0.20 |
| | | After heat treatment Q2 | 0.21 | 0.20 | 0.24 | 0.20 |
| | | Difference Q2 − Q1 | 0.01 | 0.00 | 0.04 | 0.00 |
| | Contact cool feeling: sensory evaluation | Before heat treatment | 6 | 6 | 6 | 6 |
| | | After heat treatment | 5 | 6 | 4 | 6 |
| | Contact hot feeling: sensory evaluation | Before heat treatment | 6 | 6 | 6 | 6 |
| | | After heat treatment | 5 | 6 | 4 | 6 |
| | Texture | | B | C | B | C |

TABLE 2

| | | | Exp. 10 | Exp. 11 | Exp. 12 | Exp. 13 | Comp. Exp. 1 |
|---|---|---|---|---|---|---|---|
| Cellular heat-insulating layer Formulation (parts by mass) | Main agent: water-based polyurethane resin | LCC Binder UB-1770 | 100 | 100 | 100 | 100 | 45 |
| | | BAYDERM Bottom 51UD | — | — | — | — | 55 |
| | | BAYDERM Finish 61UD | — | — | — | — | — |
| | Hollow fine particles: foamed microcapsules | Matsumoto Microsphere FN-100S | — | — | — | — | 2.5 |
| | | Matsumoto Microsphere F-50 | 2.5 | — | — | — | — |
| | | Matsumoto Microsphere F-230D | — | 2.5 | — | — | — |
| | | Matsumoto Microsphere F-48 | — | — | 2.5 | — | — |
| | | Matsumoto Microsphere F-2800D | — | — | — | 2.5 | — |
| | | Matsumoto Microsphere F-30 | — | — | — | — | — |
| | | Matsumoto Microsphere F-2860D | — | — | — | — | — |
| | Crosslinking agent: isocyanate-based | AQUADERM XL-50 | 1 | 1 | 1 | 1 | 1 |
| | Leveling agent: water dispersion type silicon-based | AQUADERM Fluid H | 1 | 1 | 1 | 1 | 1 |
| | Water | | 20 | 20 | 20 | 20 | 20 |
| Cellular heat-insulating layer Constitution | Cellular heat-insulating layer | Thickness (μm) | 150 | 150 | 150 | 150 | 150 |
| | | Ratio of closed holes (%) | 90 | 90 | 90 | 90 | 90 |
| | | Size of closed holes (major diameter: μm) | 50 | 20 | 50 | 20 | 50 |
| | | Tg of matrix (° C.) | −60 | −60 | −60 | −60 | −70 |
| | | Softening temperature of matrix (° C.) | 175 | 175 | 175 | 175 | 100 |
| | | Softening temperature of cellular heat-insulating layer (° C.) | 135 | 175 | 120 | 175 | 100 |

TABLE 2-continued

| | | | | | | | |
|---|---|---|---|---|---|---|---|
| | Hollow fine particles | Outer shell resin | | Acrylonitrile-based polymer | | | |
| | | Tg of outer shell (° C.) | 70 | 70 | 70 | 70 | 70 |
| | | Softening temperature of outer shell (° C.) | 135 | 215 | 120 | 240 | 150 |
| | | Inclusions | | | Isopentane | | |
| | | Average particle diameter (μm) | 50 | 20 | 50 | 20 | 50 |
| Evaluation | Ratio of contact area (%) | | 50 | 50 | 50 | 50 | 50 |
| | Contact cool feeling: Qmax (W/cm$^2$) | Before heat treatment Q1 | 0.20 | 0.20 | 0.20 | 0.20 | 0.20 |
| | | After heat treatment Q2 | 0.22 | 0.20 | 0.24 | 0.20 | 0.35 |
| | | Difference Q2 − Q1 | 0.02 | 0.00 | 0.04 | 0.00 | 0.15 |
| | Contact cool feeling: sensory evaluation | Before heat treatment | 6 | 6 | 6 | 6 | 6 |
| | | After heat treatment | 6 | 6 | 4 | 6 | 1 |
| | Contact hot feeling: sensory evaluation | Before heat treatment | 6 | 6 | 6 | 6 | 6 |
| | | After heat treatment | 6 | 6 | 4 | 6 | 1 |
| | Texture | | B | B | B | C | A |

| | | | | Comp. Exp. 2 | Comp. Exp. 3 | Comp. Exp. 4 | Comp. Exp. 5 |
|---|---|---|---|---|---|---|---|
| Cellular heat-insulating layer Formulation (parts by mass) | Main agent: water-based polyurethane resin | LCC Binder UB-1770 | | 100 | 45 | — | 100 |
| | | BAYDERM Bottom 51UD | | — | 55 | — | — |
| | | BAYDERM Finish 61UD | | — | — | 100 | — |
| | Hollow fine particles: foamed microcapsules | Matsumoto Microsphere FN-100S | | — | — | — | 0.1 |
| | | Matsumoto Microsphere F-50 | | — | — | — | — |
| | | Matsumoto Microsphere F-230D | | — | — | — | — |
| | | Matsumoto Microsphere F-48 | | — | — | — | — |
| | | Matsumoto Microsphere F-2800D | | — | — | — | — |
| | | Matsumoto Microsphere F-30 | | 2.5 | 2.5 | — | — |
| | | Matsumoto Microsphere F-2860D | | — | — | 2.5 | — |
| | Crosslinking agent: isocyanate-based | AQUADERM XL-50 | | 20 | 1 | 20 | 1 |
| | Leveling agent: water dispersion type silicon-based | AQUADERM Fluid H | | 1 | 1 | 1 | 1 |
| | Water | | | 20 | 20 | 20 | 20 |
| Cellular heat-insulating layer Constitution | Cellular heat-insulating layer | Thickness (μm) | | 150 | 150 | 150 | 150 |
| | | Ratio of closed holes (%) | | 90 | 90 | 90 | 4 |
| | | Size of closed holes (major diameter: μm) | | 40 | 40 | 20 | 50 |
| | | Tg of matrix (° C.) | | −60 | −70 | 0 | −60 |
| | | Softening temperature of matrix (° C.) | | 175 | 100 | 270 | 175 |
| | | Softening temperature of cellular heat-insulating layer (° C.) | | 100 | 100 | 260 | 175 |
| | Hollow fine particles | Outer shell resin | | Vinyl chloride-acrylonitrile-based polymer | | Acrylonitrile-based polymer | |
| | | Tg of outer shell (° C.) | | 40 | 40 | 100 | 70 |
| | | Softening temperature of outer shell (° C.) | | 100 | 100 | 260 | 150 |
| | | Inclusions | | | Isopentane | | |
| | | Average particle diameter (μm) | | 40 | 40 | 20 | 50 |
| Evaluation | Ratio of contact area (%) | | | 50 | 50 | 50 | 50 |
| | Contact cool feeling: Qmax (W/cm$^2$) | Before heat treatment Q1 | | 0.20 | 0.20 | 0.20 | 0.20 |
| | | After heat treatment Q2 | | 0.35 | 0.35 | 0.20 | 0.35 |
| | | Difference Q2 − Q1 | | 0.15 | 0.15 | 0.00 | 0.15 |
| | Contact cool feeling: sensory evaluation | Before heat treatment | | 6 | 6 | 6 | 6 |
| | | After heat treatment | | 1 | 1 | 6 | 1 |
| | Contact hot feeling: sensory evaluation | Before heat treatment | | 6 | 6 | 6 | 6 |
| | | After heat treatment | | 1 | 1 | 6 | 1 |
| | Texture | | | B | A | D | B |

DESCRIPTION OF REFERENCE NUMERALS AND SIGNS

1 . . . Skin material
2 . . . Fibrous substrate
3 . . . Cellular heat-insulating material
4 . . . Coloring layer
5 . . . Protective layer
6 . . . Front face of skin material

The invention claimed is:

1. A skin material comprising a closed cellular heat-insulating layer and a coloring layer which are sequentially stacked on a fibrous substrate, wherein the skin material has unevennesses on a front face, the closed cellular heat-insulating layer has a softening temperature of 110° C. to 250° C., and a contact cool feeling (Qmax) of the front face of the skin material is 0.30 W/cm$^2$ or less both before and after a heat treatment for 2400 hours at 70° C., and wherein the closed cells of the closed cellular heat-insulating layer consist of closed cells obtained by mixing a resin serving as a matrix with hollow particles forming the closed cells of the cellular heat-insulating layer, the hollow particles consist of expanded polymeric microcapsules, and each of closed cells consists of a respective one of the expanded polymeric microcapsules, and the matrix has a softening temperature of 110° C. to 250° C., and a glass transition point of −100° C. to 50° C., and a resin that forms outer shells of the hollow particles has a softening temperature of 110° C. to 250° C., and a glass transition point of 50° C. to 150° C.

2. The skin material of claim 1, wherein a contact area ratio on the front face of the skin material is 65% or less.

3. The skin material of claim 2, wherein a protective layer is stacked on the coloring layer.

4. The skin material of claim 1, wherein a protective layer is stacked on the coloring layer.

5. The skin material of claim 1, wherein the closed cells have a diameter of 10 μm to 200 μm.

6. The skin material of claim 5, wherein the diameter of the closed cells is 15 μm to 100 μm.

7. The skin material of claim 1, wherein the closed cells are present in an area ratio of 75% to 95% as measured as a percentage of a vertical cross section of the cellular heat-insulating layer occupied by the closed cells.

* * * * *